United States Patent [19]
Brazdil et al.

[11] Patent Number: 5,498,588
[45] Date of Patent: Mar. 12, 1996

[54] SURFACE MODIFICATION AND PROMOTION OF VANADIUM ANTIMONY OXIDE CATALYSTS

[75] Inventors: James F. Brazdil, Highland Heights; Fernando A. P. Cavalcanti, South Euclid, both of Ohio

[73] Assignee: The Standard Oil Company, Cleveland, Ohio

[21] Appl. No.: 304,029

[22] Filed: Sep. 9, 1994

[51] Int. Cl.$^6$ ....................................... B01J 23/16
[52] U.S. Cl. .................... 502/353; 502/311; 502/312
[58] Field of Search ................................. 502/312, 311, 502/353

[56] References Cited

U.S. PATENT DOCUMENTS

| | | | |
|---|---|---|---|
| 4,021,427 | 5/1977 | Delhyj et al. | 502/313 |
| 4,290,920 | 9/1981 | Suresh et al. | 502/313 |
| 4,746,641 | 5/1988 | Guttmann et al. | 502/313 |
| 4,784,979 | 11/1988 | Toft et al. | 502/353 |
| 4,879,264 | 11/1989 | Toft et al. | 502/353 |
| 5,008,427 | 4/1991 | Brazdil, Jr. et al. | |
| 5,079,207 | 1/1992 | Brazdil et al. | 502/312 |
| 5,094,989 | 3/1992 | Lynch et al. | |
| 5,139,988 | 8/1992 | Sasaki et al. | 502/312 |

Primary Examiner—Asok Pal
Attorney, Agent, or Firm—Michael F. Esposito; David J. Untener

[57] ABSTRACT

The process of manufacturing a catalyst having the following empirical formula:

$$VSb_m A_a D_d O_x$$

where A is one or more of Ti, Sn, Fe, Cr, Ga, Li, Mg, Ca, Sr, Ba, Co, Ni, Zn, Ge, Nb, Zr, Mo, W, Cu, Te, Ta, Se, Bi, Ce, In, As, B and Mn, D is one or more of Li, Ag, Fe, Co, Cu, Cr, Mn, $(VO)^{2+}$, $(PW_{12}O_{40})^{3-}$ and $(PMo_{12}O_{40})^{3-}$ m is from about 0.5 to 10 a is 0.01 to 10 d is 0.0001 to 2.0, preferably 0.0001 to 0.1;

x= number of oxygen ions necessary to satisfy the valency requirement
comprising forming a catalyst precursor having the formula VSbmAaOx wherein m, A, a and x are defined above, adding at least one D element to the surface of said catalyst precursor and calcining the surface modified catalyst precursor to produce said catalyst.

13 Claims, No Drawings

SURFACE MODIFICATION AND PROMOTION OF VANADIUM ANTIMONY OXIDE CATALYSTS

BACKGROUND OF THE INVENTION

FIELD OF THE INVENTION

This invention relates to a method of preparing promoted vanadium antimony oxide catalysts useful in catalytic hydrocarbon ammoxidation to α, β-unsaturated mononitriles; i.e., acrylonitrile and methacrylonitrile, catalytic oxidation, and $NO_x$ reduction. In particular, the process of the present invention provides promoted $VSbO_x$ catalysts useful in the ammoxidation of propane to acrylonitrile.

Because of the price differential between propylene and propane an economic incentive exists for the development of a viable catalytic process for conversion of propane to acrylonitrile.

Earlier attempts in the prior art to develop an efficient process for the ammoxidation of propane to acrylonitrile produced either insufficient yields or processes that necessitated adding halogen promoters to the feed. The latter procedure would require not only reactors made of special corrosion resistant materials, but also the quantitative recovery of the promoter. The added costs thus eliminated the advantage of the propane/propylene price differential.

In U.S. Pat. No. 3,860,534 there are disclosed catalysts for the ammoxidation of propane (or other alkanes) using an excess of propane to both ammonia and molecular oxygen wherein the ranges of the paraffin to $NH_3$ and to $O_2$ overlap the ranges of the present process. The catalyst may be mixed with particles of an inert and refractory material, or applied as a layer on the surface of an inert support. Except for such inert materials, the catalyst contains only V, Sb and oxygen. The catalyst is calcined at 350° to 950° C., preferably 700° to 900° C., and particularly 750° to 870° C., and most desirably 790° to 850° C. The essence of the invention is that before use the catalyst is water-washed for long periods in water.

Earlier (earlier filed in the priority country) British patent specification No. 1,336,135, having a common assignee and a common inventor with the aforesaid U.S. patent, discloses inter alia the use of catalysts containing only V and Sb in oxidic form in the ammoxidation of paraffins such as propane at the same alkane to $NH_3$ and $O_2$ ratios, the catalysts being calcined at 300©to 950° C., preferably 600° to 850° C. However, the calcined catalysts are not water-washed. The earlier specification also discloses that the catalysts can contain V and Sb and only one other metal. The sole third component disclosed for addition to a V, Sb catalyst is tin, and this is only by way of specific Example III.

U.S. Pat. No. 4,746,641, Guttmann et al. discloses ammoxidation of paraffins including propane and isobutane at ratios of reactants different than the present claims using catalysts that can contain Sn in addition to V and Sb.

British Patent No. 1,336,136, another earlier patent to the common assignee and to a sole inventor who is the common inventor in British Patent No. 1,336,135 and U.S. Pat. No. 3,860,534 is much the same as British Patent No. 1,336,135 but more narrow. Thus, all of the catalysts contain V and Sb in oxidic form with or without only one other metal. The only such other metal identified is tin, which is in Example III, identical to Example III of British No. 1,336,135, already discussed.

Canadian patent No. 901,006 also relates to ammoxidation of propane and isobutane using catalysts of seven different categories. The only pertinent category uses exactly three metals in oxidic form in combination, exclusive of the combination V-Sb-Sn. The three are chosen from Sb, Sn, Ti, V and U. No proportions are suggested, except in specific examples. No specific suggestion of, or specific example of, a catalyst having V, Sb and Ti is disclosed.

Recent U.S. Pat. Nos. 4,784,929, 4,879,264, 5,008,427 and 5,094,989, all assigned to the assignee of the instant application disclosed various procedures for preparation of $VSbO_x$ catalyst or $VSbO_x$ promoted catalyst useful in the ammoxidation of propane to acrylonitrile.

SUMMARY OF THE INVENTION

It is an object of the present invention to provide an improved process for the manufacture of $VSbO_x$ promoted catalysts.

It is a further object of the present invention to provide an improved catalytic ammoxidation process for making unsaturated mononitriles from lower paraffins.

Other objects, as well as aspects, features and advantages, of the present invention will become apparent from a study of the accompanying disclosure and the claims.

According to one aspect of the present invention, the process of manufacturing a catalyst having the following empirical formula:

$$VSb_mA_aD_dO_x$$

where A is one or more of Ti, Sn, Fe, Cr, Ga, Li, Mg, Ca, Sr, Ba, Co, Ni, Zn, Ge, Nb, Zr, Mo, W, Cu, Te, Ta, Se, Bi, Ce, In, As, B and Mn, preferably Ti, Sn, Fe, Cr, and Ge, most preferably Ti and Sn, D is one or more of Li, Ag, Fe, Co, Cu, Cr, Mn, $(VO)^{2+}$, $(PW_{12}O_{40})^{3-}$ and $(PMo_{12}O_{40})^{3-}$ m is from about 0.5 to 10 a is 0.01 to 10 d is 0. 0001 to 2.0, preferably 0. 0001 to 0.1;

x= number of oxygen ions necessary to satisfy the valency requirement comprises forming a catalyst precursor having the formula $VSb_mA_aO_x$ wherein m, A, a and x are defined above, adding said one or more D elements to the surface of said catalyst precursor and calcining the surface modified catalyst precursor to produce said catalyst.

The catalyst precursor may be prepared by any method known in the art for synthesis of mixed metal oxides. The synthesis methods of U.S. Pat. Nos. 4,784,979 and 4,879, 264 are preferred and are herein incorporated by reference. The catalyst precursor may be unsupported or may be supported on any suitable carrier. The catalysts of the present invention can be used in fixed bed, fluid bed, or transport line reactors or in any other suitable reactor configuration.

Elements D are added to the surface of the catalyst at any stage after the basic $VSb_mA_aO_x$ precursor has been synthesized, e.g., after drying and calcination and before or after the precursor has been washed using water, isobutanol, methanol or other solvents after any of the calcination steps (preferably after washing step). Addition of the D element(s) to the catalyst surface is carried out by one or more of the following methods:

(i) Ion-exchange using water or any other suitable solvent as the medium for the exchange reaction between the catalyst matrix and the soluble reagent(s) or solid(s) (organic and/or inorganic) containing the desired element(s).

(ii) Solvothermal treatment at high temperature (100° to 450° C.) and pressure (> 1 atm) using water or any other solvent as the medium for the interaction of the catalyst matrix and the reagent(s) containing the desired element.

(iii) Incipient wetness and/or impregnation using water or any other suitable solvent as the medium for the deposition of the reagent(s) containing the desired element(s) on the surface of the catalyst matrix.

The materials obtained by any of the above methods may then be calcined for their activation in the temperature range of 100° to 1200° C. under an appropriate atmosphere (inert, oxidizing or reducing, under static or dynamic conditions). The materials obtained after calcination may then be used as prepared or further washed with water, isobutanol, methanol, acidic solutions, liquid ammonia, or any other suitable washing medium as disclosed in U.S. Pat. Nos. 3,860,534 and 5,094,989, herein incorporated by reference.

The catalyst is useful for the oxidation and ammoxidation of paraffins, olefins, and aromatic compounds, including propane ammoxidation to acrylonitrile, propylene ammoxidation to acrylonitrile, methylpyridine ammoxidation to cyanopyridine, and m-xylene ammoxidation to isophthalonitrile.

In particular, the catalysts prepared by these methods have been found to provide superior performance in propane ammoxidation to acrylonitrile. Said ammoxidation process using the catalysts disclosed herein is the same as that described in U.S. Pat. No. 5,008,427, herein incorporated by reference.

DETAILED DESCRIPTION OF THE INVENTION

The following examples illustrate the advantages of increased selectivity and/or yield when the instant invention is applied to catalysts for the ammoxidation of propane to acrylonitrile (AN). The examples are illustrative only and are not to be considered in any way limiting.

Ion-Exchange Treatment:

Surface promotion of propane ammoxidation catalysts by Ion-Exchange (IE) was carried out as follows. An aqueous solution of an appropriate compound of the promoting element D at the desired atomic ratio of D element in solution to vanadium in the catalyst (D/V) is placed in a beaker. The appropriate amount of washed precursor catalyst (catalyst prepared in accordance with U.S. Pat. No. 4,784,979 or U.S. Ser. No. 112,027 filed Aug. 26, 1993, and then washed in accordance with the procedure set forth in U.S. Pat. No. 5,094,989, each assigned to the assignee of the instant application and incorporated herein by reference) is added to this solution and the slurry is kept under stirring for at least 1 hour. After the end of this period, the catalyst is separated from the solution and rinsed with deionized water. In the case of multiple ion-exchange, this same procedure is repeated once or twice more. After the ion-exchange procedure is completed, the rinsed catalyst is placed in an oven at 120° C. to dry overnight. The dried catalyst is then calcined in air at the desired temperature for a period of 3 hours. Finally, the catalyst is washed with isobutanol, and placed in an oven at 120° C. to dry overnight. Catalysts prepared by this method were tested in a fluid-bed 60cc unit or in fixed-bed reactor under propane ammoxidation conditions. Results of these tests are summarized in Tables 1 and 2, below.

Table 1A below further demonstrates the results obtained with catalyst prepared according to the process of the present invention. The results set forth in Table 1A are obtained with fixed-bed catalyst where the ion exchange procedure has been performed twice followed by calcination after the second ion exchange procedure. The ion exchange procedure and calcination procedure are performed as described above.

TABLE 1

Ion-Exchange Treatment
Fluid-Bed Catalysts

| Experiment Number | Precursor Catalyst Composition | D Compound | Initial D/V in Solution | Feed Ratios $C_3H_8/NH_3/O_2/N_2$ | Calcination Temp. °C. | Contact Time, sec | % $C_3H_8$ conv. | % Propane Selectivity to: | | | | | |
|---|---|---|---|---|---|---|---|---|---|---|---|---|---|
| | | | | | | | | AN | Acet | HCN | CO | $CO_2$ | $C_3H_6$ |
| 1 Comparative | $V_{1.0}Sb_{1.4}Sn_{0.2}Ti_{0.1}O_x$ | None | None | 5/1.07/2.87/8.24 | none | 3.7 | 15.77 | 59.40 | 2.70 | 11.80 | 11.20 | 9.90 | 3.00 |
| 2 | $V_{1.0}Sb_{1.4}Sn_{0.2}Ti_{0.1}O_x$ | $Fe(CH_3COO)_2$ | 0.004 | 5/1.06/3.10/8.62 | 650 | 3.0 | 15.00 | 62.90 | 2.50 | 10.80 | 10.50 | 9.40 | 2.40 |
| 3 | $V_{1.0}Sb_{1.4}Sn_{0.2}Ti_{0.1}O_x$ | $FeCl_2$ | 0.012 | 5/1.06/3.05/8.52 | 600 | 4.5 | 14.32 | 63.30 | 2.00 | 10.30 | 11.30 | 9.60 | 2.40 |
| 4 Comparative | $V_{1.0}Sb_{1.4}Sn_{0.2}Ti_{0.1}O_x$ | None | None | 5/1.0/2.75/7.82 | none | 2.3 | 16.01 | 55.30 | 2.40 | 8.30 | 17.10 | 14.40 | 1.10 |
| 5 | $V_{1.0}Sb_{1.4}Sn_{0.2}Ti_{0.1}O_x$ | $Co(CH_3COO)_2$ | 0.0024 | 5/1.07/10/8.71 | 650 | 2.2 | 16.25 | 59.20 | 2.30 | 9.40 | 14.50 | 12.30 | 1.10 |
| 6 Comparative | $V_{1.0}Sb_{1.4}Sn_{0.2}Ti_{0.1}O_x$ | None | None | 3/1.03/2.69/6.9 | none | 5.4 | 29.29 | 46.00 | 1.60 | 8.60 | 23.50 | 19.40 | 0.40 |
| 7 | $V_{1.0}Sb_{1.4}Sn_{0.2}Ti_{0.1}O_x$ | $Co(CH_3COO)_2$ | 0.0024 | 3/1.04/2.81/7.2 | 650 | 5.6 | 27.73 | 49.90 | 1.60 | 9.70 | 20.90 | 16.70 | 0.60 |

TABLE 1-continued

Ion-Exchange Treatment
Fluid-Bed Catalysts

| Experiment Number | Precursor Catalyst Composition | D Compound | Initial D/V in Solution | Feed Ratios $C_3H_8/NH_3/O_2/N_2$ | Calcination Temp. °C. | Contact Time, sec | % $C_3H_8$ conv. | % Propane Selectivity to: | | | | | |
|---|---|---|---|---|---|---|---|---|---|---|---|---|---|
| | | | | | | | | AN | Acet | HCN | CO | $CO_2$ | $C_3H_6$ |
| 8 Comparative | $V_{1.0}Sb_{1.4}Sn_{0.2}Ti_{0.1}Co_{0.014}O_x$ | None | None | 5/0.96/2.99/8.36 | none | 4.0 | 15.97 | 60.60 | 2.00 | 10.10 | 13.70 | 11.80 | 0.90 |
| 9 | $V_{1.0}Sb_{1.4}Sn_{0.2}Ti_{0.1}Co_{0.014}O_x$ | $Co(CH_3COO)_2$ | 0.0024 | 5/1.14/2.96/8.59 | 650 | 3.8 | 15.62 | 62.30 | 2.20 | 10.80 | 11.70 | 11.10 | 1.20 |
| 10 Comparative | $V_{1.0}Sb_{1.4}Sn_{0.2}Ti_{0.1}Co_{0.014}O_x$ | None | None | 3/1.07/2.94/10.41 | none | 7.8 | 31.58 | 51.00 | 1.30 | 9.20 | 20.80 | 16.80 | 0.30 |
| 11 | $V_{1.0}Sb_{1.4}Sn_{0.2}Ti_{0.1}Co_{0.014}O_x$ | $Co(CH_3COO)_2$ | 0.0024 | 3/1.08/2.82/10.38 | 650 | 8.3 | 31.05 | 53.30 | 1.30 | 9.10 | 18.50 | 17.00 | 0.40 |

Pressure = 15 psig
Reaction Temp. = 460° C.

TABLE 1A

Ion-Exchange Treatment
Fixed-Bed Catalysts After Calcination

| Experiment Number | Precursor Catalyst Composition | D Compound | Initial D/V in Solution | Calcination Temp. after IE, °C. | Contact Time, sec | % $C_3H_8$ conv. | % Propane Selectivity to: | | | |
|---|---|---|---|---|---|---|---|---|---|---|
| | | | | | | | AN | HCN | $CO + CO_2$ | $C_3H_6$ |
| 12 Comparative | $V_{1.0}Sb_{1.4}Sn_{0.2}Ti_{0.1}O_x$ | none | none | none | 3.70 | 30.92 | 55.59 | 10.54 | 31.31 | 1.32 |
| 13 | $V_{1.0}Sb_{1.4}Sn_{0.2}Ti_{0.1}O_x$ | $Co(CH_3COO)_2$ | 0.01 | 650 | 3.94 | 29.60 | 57.99 | 10.52 | 29.38 | 0.90 |
| 14 | $V_{1.0}Sb_{1.4}Sn_{0.2}Ti_{0.1}O_x$ | none | none | none | 3.77 | 30.03 | 56.11 | 10.61 | 31.13 | 0.94 |
| 15 | $V_{1.0}Sb_{1.4}Sn_{0.2}Ti_{0.1}O_x$ | $Co(CH_3COO)_2$ | 0.01 | 650 | 4.02 | 29.85 | 58.21 | 10.74 | 29.25 | 0.61 |
| 16 | $V_{1.0}Sb_{1.4}Sn_{0.2}Ti_{0.1}O_x$ | none | none | none | 3.55 | 30.68 | 56.53 | 10.40 | 31.35 | 0.59 |
| 17 | $V_{1.0}Sb_{1.4}Sn_{0.2}Ti_{0.1}O_x$ | $Co(CH_3COO)_2$ | 0.01 | 650 | 3.34 | 29.78 | 57.95 | 10.32 | 29.74 | 0.79 |

Reaction Conditions: 480° C.; 1 atm; 3.0 $C_3H_8/1.16$ $NH_3/2.88$ $O_2/10.31$ $N_2/1.94$ $H_2O$
IE = Twice ion-exchanged in an aqueous solution having an initial atomic ratio of D element to vanadium in solution (D/V) at 23° C. for at least 1 hour; dried catalyst then calcined in air for 3 hours at indicated temperature.
Precursor for ion-exchange = $V_{1.0}Sb_{1.4}Sn_{0.2}Ti_{0.1}O_x$ (after second calcination at 650° C. and isobutanol wash)

TABLE 2

Ion-Exchange Treatment
Fixed-Bed Catalysts

| Experiment Number | Catalyst Composition | D Compound | Initial D/V in Solution | Calcination Temp, °C. | Contact Time, sec | % $C_3H_8$ conv. | % Propane Selectivity to: | | | |
|---|---|---|---|---|---|---|---|---|---|---|
| | | | | | | | AN | HCN | $CO + CO_2$ | $C_3H_6$ |
| 18 Comparative | $V_{1.0}Sb_{1.4}Sn_{0.2}Ti_{0.1}O_x$ | none | none | none | 1.70 | 14.70 | 60.90 | 11.00 | 22.60 | 1.50 |
| 19 | $V_{1.0}Sb_{1.4}Sn_{0.2}Ti_{0.1}O_x$ | $Co(CH_3COO)_2$ | 0.016 | 650 | 2.60 | 14.70 | 65.90 | 9.90 | 19.40 | 1.50 |
| 20 | $V_{1.0}Sb_{1.4}Sn_{0.2}Ti_{0.1}O_x$ | $Li(CH_3COO)$ | 0.016 | 650 | 2.80 | 14.20 | 65.10 | 10.00 | 20.10 | 1.40 |
| 21 | $V_{1.0}Sb_{1.4}Sn_{0.2}Ti_{0.1}O_x$ | $Cu(CH_3COO)_2$ | 0.016 | 650 | 3.00 | 15.20 | 64.50 | 10.30 | 20.90 | 1.40 |

TABLE 2-continued

| Experiment Number | Catalyst Composition | D Compound | Initial D/V in Solution | Calcination Temp, °C. | Contact Time, sec | % $C_3H_8$ conv. | % Propane Selectivity to: | | | |
|---|---|---|---|---|---|---|---|---|---|---|
| | | | | | | | AN | HCN | CO + $CO_2$ | $C_3H_6$ |
| 22 | $V_{1.0}Sb_{1.4}Sn_{0.2}Ti_{0.1}O_x$ | $Cu(CH_3COO)_2$ | 0.016 | 500 | 2.10 | 14.70 | 61.20 | 9.90 | 24.50 | 1.00 |
| 23 | $V_{1.0}Sb_{1.4}Sn_{0.2}Ti_{0.1}O_x$ | $Mn(CH_3COO)_2$ | 0.016 | 650 | 3.30 | 15.80 | 62.30 | 10.50 | 23.00 | 1.20 |
| 24 | $V_{1.0}Sb_{1.4}Sn_{0.2}Ti_{0.1}O_x$ | $Cr(CH_3COO)_3$ | 0.016 | 650 | 2.90 | 15.90 | 64.00 | 10.20 | 21.60 | 1.20 |
| 25 | $V_{1.0}Sb_{1.4}Sn_{0.2}Ti_{0.1}O_x$ | $Fe(CH_3COO)_2$ | 0.016 | 650 | 2.70 | 16.00 | 64.70 | 10.40 | 20.70 | 1.40 |
| 26 | $V_{1.0}Sb_{1.4}Sn_{0.2}Ti_{0.1}O_x$ | $VO(CH_3COO)_2$ | 0.016 | 650 | 1.40 | 15.50 | 60.90 | 10.40 | 22.00 | 2.30 |
| 27 | $V_{1.0}Sb_{1.4}Sn_{0.2}Ti_{0.1}O_x$ | $VO(CH_3COO)_2$ | 0.016 | 500 | 1.90 | 15.90 | 61.40 | 10.10 | 23.80 | 1.30 |
| 28 | $V_{1.0}Sb_{1.4}Sn_{0.2}Ti_{0.1}O_x$ | $H_3(PW_{12}O_{40})$ | 0.081 | 500 | 1.70 | 14.10 | 62.00 | 10.80 | 21.80 | 1.70 |
| 29 | $V_{1.0}Sb_{1.4}Sn_{0.2}Ti_{0.1}O_x$ | $H_3(PMo_{12}O_{40})$ | 0.081 | 650 | 1.30 | 14.40 | 61.40 | 10.70 | 22.20 | 2.60 |

Reaction Conditions: 460° C.; 1 atm; 5.0 $C_3H_8$/1.0 $NH_3$/2.8 $O_2$/1.0 $H_2O$
IE = Ion-Exchange Treatment in aqueous solution having a nominal element to vanadium (D/V) ratio at 23° C. for at least 1 hour.

Solvothermal Treatment:

Surface promotion of propane ammoxidation catalysts by HydroThermal Treatment (HTT) was carried out as follows. An aqueous solution of an appropriate compound of the promoting D element at the desired atomic ratio of D element in solution to vanadium in the catalyst (D/V) is placed in the Teflon cup of a Parr Digestion Bomb. The appropriate amount of washed precursor catalyst (catalyst prepared in accordance with U.S. Pat. No. 4,784,979 or U.S. Ser. No. 112,027 filed Aug. 26, 1993 and then washed in accordance with the procedure set forth in U.S. Pat. No. 5,094,989, each assigned to the assignee of the instant application and incorporated herein by reference) is added to this solution, the bomb is closed and placed in an oven at 180° C. for 16 hours. After cooling back to room temperature, the bomb is opened, the catalyst is separated from the solution, rinsed with deionized water and placed in an oven at 120° C. to dry overnight. The dried catalyst is then calcined in air at the desired temperature for a period of 3 hours. Finally, the catalyst is washed with isobutanol and placed in an oven at 120° C. to dry overnight. Catalysts prepared by this method were tested in a fixed-bed microreactor under propane ammoxidation conditions. Results of these tests are summarized in Table 3.

TABLE 3

Solvothermal Treatment
Fixed-Bed Catalysts

| Experiment Number | Catalyst Composition | D Compound | Initial D/V in Solution | Calcination Temp, °C. | Contact Time, sec | % $C_3H_8$ conv. | % Propane Selectivity to: | | | |
|---|---|---|---|---|---|---|---|---|---|---|
| | | | | | | | AN | HCN | CO + $CO_2$ | $C_3H_6$ |
| 30 Comparative | $V_{1.0}Sb_{1.4}Sn_{0.2}Ti_{0.1}O_x$ | none | none | none | 2.40 | 14.50 | 61.40 | 10.00 | 22.10 | 3.40 |
| 31 | $V_{1.0}Sb_{1.4}Sn_{0.2}Ti_{0.1}O_x$ | $H_2O$ only | none | none | 2.70 | 14.90 | 60.80 | 9.30 | 25.30 | 1.90 |
| 32 | $V_{1.0}Sb_{1.4}Sn_{0.2}Ti_{0.1}O_x$ | LiOH | 0.001 | 650 | 2.60 | 14.40 | 62.80 | 9.90 | 22.10 | 2.40 |
| 33 | $V_{1.0}Sb_{1.4}Sn_{0.2}Ti_{0.1}O_x$ | LiOH | 0.001 | 650 | 2.70 | 14.50 | 63.70 | 8.40 | 23.40 | 1.50 |
| 34 | $V_{1.0}Sb_{1.4}Sn_{0.2}Ti_{0.1}O_x$ | LiOH | 0.001 | 700 | 3.10 | 13.40 | 63.50 | 10.00 | 23.20 | 0.30 |
| 35 | $V_{1.0}Sb_{1.4}Sn_{0.2}Ti_{0.1}O_x$ | $AgNO_3$ | 0.001 | 650 | 2.80 | 14.20 | 63.40 | 10.60 | 22.00 | 1.20 |
| 36 | $V_{1.0}Sb_{1.4}Sn_{0.2}Ti_{0.1}O_x$ | $Co(NO_3)_2$ | 0.001 | 650 | 2.80 | 14.80 | 63.40 | 8.50 | 24.40 | 0.90 |
| 37 Comparative | $V_{1.0}Sb_{1.4}Sn_{0.2}Ti_{0.1}O_x$ | none | none | none | 2.20 | 15.70 | 61.80 | 8.00 | 25.90 | 1.50 |
| 38 Comparative | $V_{1.0}Sb_{1.4}Sn_{0.2}Ti_{0.1}O_x$ | $H_2O$ only | none | 650 | 3.10 | 15.20 | 62.40 | 8.00 | 26.70 | 0.30 |
| 39 | $V_{1.0}Sb_{1.4}Sn_{0.2}Ti_{0.1}O_x$ | $Fe(CH_3COO)_2$ | 0.001 | 650 | 2.70 | 15.10 | 65.10 | 9.60 | 22.60 | 0.00 |
| 40 | $V_{1.0}Sb_{1.4}Sn_{0.2}Ti_{0.1}O_x$ | $Fe(CH_3COO)_2$ | 0.0005 | 650 | 3.10 | 15.20 | 64.30 | 8.90 | 23.90 | 0.40 |

TABLE 3-continued

Solvothermal Treatment
Fixed-Bed Catalysts

| Experiment Number | Catalyst Composition | D Compound | Initial D/V in Solution | Calcination Temp, °C. | Contact Time, sec | % $C_3H_8$ conv. | % Propane Selectivity to: | | | |
|---|---|---|---|---|---|---|---|---|---|---|
| | | | | | | | AN | HCN | $CO + CO_2$ | $C_3H_6$ |
| 41 | $V_{1.0}Sb_{1.4}Sn_{0.2}Ti_{0.1}O_x$ | $Cr(CH_3COO)_3$ | 0.001 | 650 | 3.20 | 15.60 | 62.50 | 8.10 | 26.60 | 0.30 |
| 42 | $V_{1.0}Sb_{1.4}Sn_{0.2}Ti_{0.1}O_x$ | $Mn(CH_3COO)_2$ | 0.001 | 650 | 3.20 | 15.30 | 62.40 | 8.30 | 26.20 | 0.60 |

Reaction Conditions: 460° C.; 1 atm; 5.0 $C_3H_8$/1.0 $NH_3$/2.8 $O_2$/1.0 $H_2O$
HTT = Hydro Thermal Treatment in aqueous solution having a nominal D element to vanadium (D/V) ratio at 180° C. for 16 hours.

Impregnation Treatment:

Surface promotion of propane ammoxidation catalysts by Impregnation (IMP) was carried out as follows. An aqueous solution of an appropriate compound of the D promoting element at the desired atomic ratio of D element in solution to vanadium in the catalyst (D/V) is placed in a Pyrex flask. The appropriate amount of washed catalyst precursor (prepared in accordance with the procedure set forth previously) is added to this solution. The flask containing the slurry is attached to a Rotoevaporator. The slurry in the flask is then evaporated to dryness by rotating the flask in a water bath at 55° C. under a slight vacuum for at least 3 hours. After the end of this period, the catalyst is removed from the flask and placed in an oven at 120° C. to dry overnight. The dried catalyst is then calcined in air at the desired temperature for a period of 3 hours. In the final step the catalyst is washed with isobutanol and placed in an oven at 120° C. to dry overnight. Catalysts prepared by this method were tested in a fixed-bed micro-reactor under propane ammoxidation conditions. Results of these tests are summarized in Table 4.

the particular use contemplated. It is intended that the scope of the invention be defined by the claims appended hereto.

What we claim as our invention is:

1. A process for the manufacture of a catalyst having the following empirical formula:

$$VSb_mA_aD_dO_x$$

where A is one or more of Ti, Sn, Fe, Cr, Ga, Li, Mg, Ca, Sr, Ba, Co, Ni, Zn, Ge, Nb, Zr, Mo, W, Cu, Te, Ta, Se, Bi, Ce, In, As, B and Mn, D is one or more of Li, Ag, Fe, Co, Cu, Cr, Mn, $(VO)^{2+}$, $(PW_{12}O_{40})^{3-}$ and $(PMo_{12}O_{40})^{3-}$ m is from about 0.5 to 10 a is 0.01 to 10 d is 0.0001 to 2.0, preferably 0.0001 to 0.1;

x= number of oxygen ions necessary to satisfy the valency requirement comprising forming a calcined catalyst precursor having the formula VSbmAaOx wherein m, A, a and x are defined

TABLE 4

Impregnation Treatment
Fixed-Bed Catalysts

| Experiment Number | Catalyst Composition | D Compound | Initial D/V in Solution | Calcination Temp, °C. | Contact Time, sec | % $C_3H_8$ conv. | % Propane Selectivity to: | | | |
|---|---|---|---|---|---|---|---|---|---|---|
| | | | | | | | AN | HCN | $CO + CO_2$ | $C_3H_6$ |
| 43 Comparative | $V_{1.0}Sb_{1.4}Sn_{0.2}Ti_{0.1}O_x$ | none | none | none | 2.40 | 14.50 | 61.40 | 10.00 | 22.10 | 3.40 |
| 44 | $V_{1.0}Sb_{1.4}Sn_{0.2}Ti_{0.1}O_x$ | LiOH | 0.001 | 650 | 4.60 | 14.40 | 62.70 | 8.60 | 23.70 | 2.30 |
| 45 Comparative | $V_{1.0}Sb_{1.4}Sn_{0.2}Ti_{0.1}O_x$ | none | none | none | 2.20 | 15.70 | 61.80 | 8.00 | 25.90 | 1.50 |
| 46 | $V_{1.0}Sb_{1.4}Sn_{0.2}Ti_{0.1}O_x$ | $Fe(CH_3COO)_2$ | 0.001 | 650 | 4.20 | 15.40 | 63.50 | 8.50 | 24.80 | 0.90 |
| 47 | $V_{1.0}Sb_{1.4}Sn_{0.2}Ti_{0.1}O_x$ | $Fe(CH_3COO)_2$ | 0.001 | 700 | 4.10 | 14.60 | 63.90 | 8.90 | 24.50 | 0.20 |

Reaction Conditions: 460° C.; 1 atm; 5.0 $C_3H_8$/1.0 $NH_3$/2.8 $O_2$/1.0 $H_2O$
IMP = Impregnation Treatment in aqueous solution having a nominal D element to vanadium (E/V) ratio at 55° C. for at least 3 hours.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to above, adding at least one D element to the surface of said catalyst precursor and calcining the surface modified catalyst precursor to produce said catalyst.

2. The process of claim 1 wherein A equals one or more elements selected from the group consisting of Ti, Sn, Fe, Cr and Ge.

3. The process of claim 2 wherein A equals one or more elements selected from the group consisting of Ti and Sn.

4. The process of claim 1 wherein the D element is added to the surface of the catalyst precursor by impregnation.

5. The process of claim 1 wherein the D element is added to the surface of the catalyst precursor by ion exchange.

6. The process of claim 1 wherein the D element is added to the surface of the catalyst precursor by solvothermal treatment.

7. The process of claim 1 wherein the calcined catalyst is washed with alcohol and dried overnight.

8. The process of claim 7 wherein the alcohol is isobutanol.

9. A catalyst prepared by the method of claim 1.

10. A catalyst prepared by the method of claim 2.

11. A catalyst prepared by the method of claim 3.

12. A catalyst prepared by the method of claim 7.

13. A catalyst prepared by the method of claim 8.

* * * * *